United States Patent [19]

Schönfelder et al.

[11] Patent Number: 4,478,893
[45] Date of Patent: Oct. 23, 1984

[54] POLYISOCYANATE ADDITION PRODUCTS USEFUL AS MOLD RELEASE AGENTS AND A PROCESS FOR THEIR PRODUCTION

[75] Inventors: Manfred Schönfelder, Leverkusen; Peter Haas, Haan; Geza Avar; Helmut Steinberger, both of Leverkusen, all of Fed. Rep. of Germany

[73] Assignee: Bayer Aktiengesellschaft, Leverkusen, Fed. Rep. of Germany

[21] Appl. No.: 539,508

[22] Filed: Oct. 6, 1983

Related U.S. Application Data

[62] Division of Ser. No. 445,323, Nov. 29, 1982.

[30] Foreign Application Priority Data

Dec. 15, 1981 [DE] Fed. Rep. of Germany ....... 3149619

[51] Int. Cl.$^3$ ............................................. B05D 3/02
[52] U.S. Cl. ..................................... 427/387; 264/46.6; 264/338; 264/331.11; 528/18; 528/28; 528/29; 556/414; 556/419; 556/420; 525/474
[58] Field of Search ................... 264/46.6, 338, 331.11; 427/387; 528/18, 28, 29; 556/414, 419, 420; 525/474

[56] References Cited

U.S. PATENT DOCUMENTS

| | | | |
|---|---|---|---|
| 3,726,952 | 4/1973 | Boden et al. | 264/48 |
| 3,993,606 | 11/1976 | von Bonin et al. | 260/2.5 AH |
| 4,024,090 | 5/1977 | von Bonin et al. | 260/2.5 AH |
| 4,033,912 | 7/1977 | Kleinmann et al. | 260/2.5 AH |
| 4,058,492 | 11/1977 | von Bonin et al. | 260/2.5 AH |
| 4,098,731 | 7/1978 | von Bonin et al. | 521/51 |
| 4,163,830 | 8/1979 | Windemuth et al. | 521/111 |

FOREIGN PATENT DOCUMENTS

| | | |
|---|---|---|
| 3012126 | 10/1981 | Fed. Rep. of Germany . |
| 1365215 | 8/1974 | United Kingdom . |
| 1420293 | 1/1976 | United Kingdom . |

*Primary Examiner*—Melvyn I. Marquis
*Attorney, Agent, or Firm*—Gene Harsh; Joseph C. Gil; Lyndanne M. Whalen

[57] ABSTRACT

Polyisocyanate addition products are made by reacting a polysiloxane having isocyanate reactive end groups, excess polyisocyanate and a compound selected from the group consisting of aliphatic alcohols, primary aliphatic amines, secondary aliphatic amines and mixtures thereof having a molecular weight of from 75 to 5000 and at least one tertiary amino group and/or oxyalkylene unit. In a preferred embodiment, the polysiloxane is reacted with excess polyisocyanate and the reaction product is subsequently reacted with the alcohol and/or amine. The addition products of this invention are particularly useful as mold release agents in the production of molded lacquer coated plastics by the "in-mold coating process."

6 Claims, No Drawings

POLYISOCYANATE ADDITION PRODUCTS USEFUL AS MOLD RELEASE AGENTS AND A PROCESS FOR THEIR PRODUCTION

This application is a division of application Ser. No. 445,323, filed Nov. 29, 1982.

BACKGROUND OF THE INVENTION

This invention relates to a process for the preparation of polyisocyanate addition products suitable as mold release agents.

In the production of molded plastics formed inside the mold (for example, polyurethane-based molded foams having an integral density distribution) it is necessary to either coat the internal walls of the mold with an external mold release agent or to introduce an internal mold release agent into the reaction mixtures so that the molded articles may be easily removed from the mold and faithfully reproduce the internal shape and structure of the mold. The production of integral foams using such internal mold release agents has been described, for example, in British Pat. Nos. 1,365,215 and 1,420,293; U.S. Pat. Nos. 3,726,952; 4,033,912; 4,024,090; 4,058,492 and 4,098,371; and German Offenlegungsschriften 2,319,648; 2,427,273 and 3,012,126.

When external mold release agents are used, the molded products must be carefully freed from mold release agent if they are to be lacquered so that the lacquer coat will adhere firmly. Even when using the mold release agents disclosed in the literature cited above, after-treatment of the molded products is often necessary prior to lacquering.

Lacquered molded plastic articles may also be produced by coating the internal walls of the mold with an "in-mold coating lacquer" before the mold is charged ("in-mold coating process"). For this process, however, it has been necessary to spray the internal walls of the mold with an external mold release agent prior to lacquering to ensure complete removal of the lacquer coated article from its mold. The disadvantage of this process is that the internal walls of the mold must be sprayed with mold release agent before each molding operation.

SUMMARY OF THE INVENTION

It is an object of the present invention to provide a process for the production of polyisocyanate addition products containing polysiloxane units.

It is also an object of the present invention to provide a mold release agent which may be incorporated in a coating lacquer.

It is a further object of the present invention to provide a mold release agent which may be incorporated in a coating lacquer and which permits complete removal of the molded article in the absence of an external mold release agent.

These and other objects which will be apparent to those skilled in the art are accomplished by reacting a polysiloxane having isocyanate reactive end groups, an excess of organic polyisocyanate and an aliphatic alcohol and/or primary or secondary amine. In one embodiment, the reaction product of the polysiloxane with polyisocyanate is further reacted with the alcohol or amine. In another embodiment, the reaction product of the alcohol or amine with the polyisocyanate is further reacted with the polysiloxane.

DETAILED DESCRIPTION OF THE INVENTION

The present invention relates to a process for the preparation of polyisocyanate addition products containing polysiloxane units which are particularly suitable as internal mold release agents for in-mold coating lacquers. These polyisocyanate addition products may be made by reacting a reaction product containing at least two isocyanate end groups (obtained by reacting polysiloxanes which are difunctional in isocyanate addition reactions containing isocyanate reactive end groups with excess quantities of organic polyisocyanates) with a compound selected from the group consisting of aliphatic alcohols or primary or secondary aliphatic amines within the molecular weight range of 75–5000 which are monofunctional in isocyanate addition reactions and contain at least one tertiary amino group and/or at least one oxyalkylene unit. These polyisocyanate addition products containing polysiloxane units may also be produced by further reacting the reaction product containing at least one isocyanate end group obtained by reacting aliphatic alcohols or primary or secondary aliphatic amines (molecular weight 75–5000) with an excess of organic polyisocyanates with polysiloxanes which contain isocyanate reactive end groups and are difunctional in isocyanate addition reactions.

The present invention also relates to the use of the polyisocyanate addition products obtained by this process as mold release agents for in-mold coating lacquers in the production of molded plastic articles covered with a layer of lacquer.

The starting materials for the process of the present invention are polysiloxanes which contain isocyanate reactive end groups and are difunctional in isocyanate addition reactions; organic polyisocyanates; and aliphatic alcohols and/or aliphatic primary or secondary amines which contain at least one tertiary amino group and/or at least one oxyalkylene unit as structural element and which are monofunctional in isocyanate addition reactions.

The difunctional polysiloxanes containing isocyanate reactive end groups are compounds which, in addition to containing isocyanate reactive organofunctional groups arranged in end positions, also contain structural units of the formula —O—Si(R)$_2$—, in which formula R denotes a C$_1$–C$_4$ alkyl group or a phenyl group, preferably a methyl group. Also suitable are the known pure polysiloxanes containing organofunctional end groups and the known siloxane polyoxyalkylene copolymers containing organofunctional end groups. Organofunctional linear polysiloxanes suitable as starting materials according to the invention have been described, for example, in German Auslegeschriften 1,114,632; 1,190,176; 1,248,287 and 2,543,638 and in German Offenlegungsschriften 2,356,692; 2,445,648; 2,363,452; 2,427,273 and 2,558,523. The organofunctional end groups are preferably aliphatic hydrocarbon groups optionally containing hetero atoms (in particular, oxygen) and carrying a hydroxyl, carboxyl, mercapto or primary or secondary amino group. The preferred carbofunctional groups include primary and secondary hydroxyl groups and secondary amino groups. Those starting compounds which have primary hydroxyl end groups are particularly preferred. The organofunctional groups contained in the starting materials may be present in the form of any of the following carbofunctional groups:

—CH$_2$OH, —(CH$_2$)$_4$OH, —CH$_2$—O—CH$_2$—CH$_2$—OH, —CH$_2$—S—CH$_2$—CH$_2$—OH, —CH$_2$SH, —CH$_2$—S—CH$_2$—CH$_2$—SH, —CH$_2$—CH$_2$—COOH, —CH$_2$—NH$_2$, —(CH$_2$)$_4$NH$_2$, —CH$_2$—NH—C$_4$H$_9$ or —CH$_2$—NH—C$_6$H$_{11}$.

The organofunctional polysiloxanes should contain at least 2, preferably 6 to 30 structural units of the formula —O—Si(R)$_2$— and have a molecular weight of from 194 to 20,000, preferably from 500 to 3000. Polysiloxanes suitable for the present invention may contain polyoxyalkylene units, in particular, polyoxyethylene and/or polyoxypropylene units in the chain in addition to the above-described structural units. The organofunctional polysiloxanes may be prepared by known methods. For example, hydroxymethylpolysiloxanes, which are particularly suitable, may be prepared by the direct reaction of bromomethylpolysiloxanes with alcoholic potassium hydroxide solution. 4-aminobutylpolysiloxanes may be prepared by hydrogenation of the readily accessible nitriles and corresponding carboxyl derivatives by saponification of cyanoalkylsilicon compounds. Aminomethylsiloxanes can be obtained by amination of halogen methyl silicon compounds with ammonia or primary amines.

In many cases, the functional groups are first introduced into low molecular weight siloxanes. The products thus obtained are then converted into higher molecular weight polysiloxanes by the known equilibration reaction.

Examples of suitable organofunctional polysiloxanes include compounds corresponding to the formula

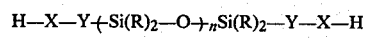

wherein

R represents a C$_1$–C$_4$ alkyl groups or a phenyl group,

X represents —O—, —NR'— (R'=aliphatic or cycloaliphatic hydrocarbon groups with up to 6 carbon atoms), —S— or —O—CO—, Y represents an alkylene group with 1 to 4 carbon atoms or an oxyalkylene or polyoxyalkylene group (alkylene=ethylene and/or propylene) obtained by removal of a terminal oxygen atom and having up to 50 oxyalkylene units, and n represents an integer of from 2 to 100, preferably from 6 to 30.

The following compounds are examples of organofunctional polysiloxane which are particularly suitable for the present invention:

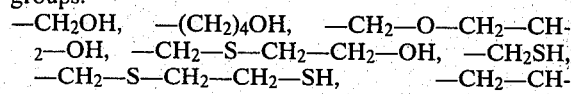

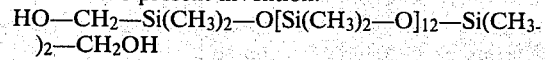

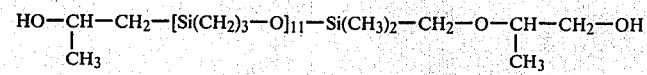

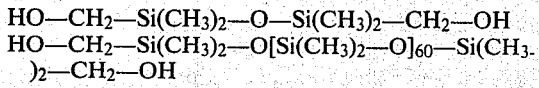

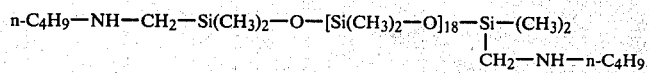

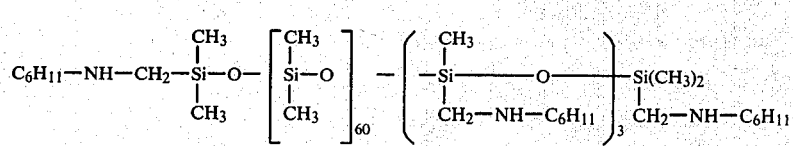

Organopolysiloxanes corresponding to the following general formula are particularly preferred in the present invention:

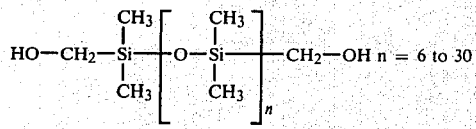

They may be prepared in known manner by the equilibration of 1,1,3,3-tetramethyl-1,3-hydroxymethyl-disiloxane corresponding to the formula

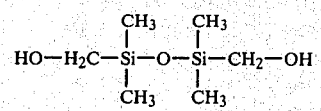

with octamethylcyclotetrasiloxane in the presence of sulfuric acid or by the process described in German Auslegeschrift 1,236,505.

Polysiloxanes which contain urethane groups and isocyanate reactive end groups and which have been chain lengthened with subequivalent quantities of diisocyanates are also suitable starting materials.

The polyisocyanates used in practicing the present invention may be aliphatic, cycloaliphatic, araliphatic or aromatic polyisocyanates such as those described, e.g., by W. Siefken in *Justus Liebigs Annalen der Chemie*, 562, pages 75 to 136. Specific examples of such polyisocyanates are: tetramethylene diisocyanate, hexamethylene diisocyanate, 1-isocyanato-3,3,5-trimethyl-5-isocyanatomethylcyclohexane, perhydro-2,4'- and/or -4,4'-diphenylmethane diisocyanate, 2,4- and 2,6-tolylene diisocyanate and any mixtures of these isomers, diphenylmethane-2,4'- and/or -4,4'-diisocyanate, naphthylene-1,5-diisocyanate and polyphenylpolymethylene polyisocyanates (described in British Pat. Nos. 874,430 and 848,671) which are obtainable by aniline-formaldehyde condensation followed by phosgenation. Modified isocyanates such as polyisocyanates containing carbodiimide, allophanate and isocyanurate groups may also be used.

It is generally preferred to use commercially readily available polyisocyanates such as 2,4- and 2,6-tolylene diisocyanate and any mixtures of these isomers ("TDI"); polyphenyl-polymethylene polyisocyanates obtained by aniline-formaldehyde condensation followed by phosgenation (MDI); 1,6-hexamethylene diisocyanate; and 1-isocyanato-3,3,5-trimethyl-5-isocyanatomethyl-cyclohexane (IPDI). IPDI is particularly preferred.

The alcohols and/or amines which may be used as starting materials in the process of the present invention are monofunctional in their addition reactions with isocyanates and contain both an aliphatically bound primary or secondary hydroxyl group or an aliphatically bound primary or secondary amino group and at least one tertiary nitrogen atom and/or at least one oxyalkylene unit containing 2 to 4 carbon atoms. These compounds have a molecular weight in the range of from 75 to 5000. Primary or secondary aliphatic alcohols or primary or secondary aliphatic amines with molecular weights in the region of 75 to 400 containing tertiary amino groups and/or oxyalkylene units are particularly suitable. Monovalent polyether alcohols in the molecular weight range of 400 to 3000 which may be nitrogen-free or contain tertiary nitrogen are also particularly suitable. The compounds containing oxyalkylene units may be prepared in known manner by the alkoxylation of suitable starter molecules, preferably using ethylene oxide and/or propylene oxide for alkoxylation. Compounds containing tetramethylene ether units may also be used.

The following are typical examples of suitable alcohol and amine starting components for the process of the present invention which contain tertiary nitrogen and/or oxyalkylene units:

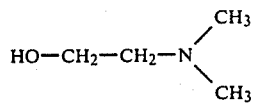

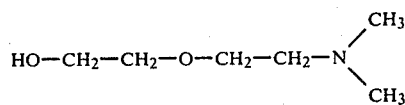

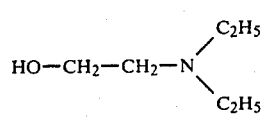

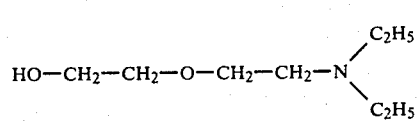

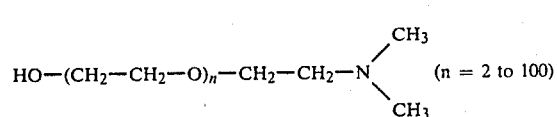 (n = 2 to 100)

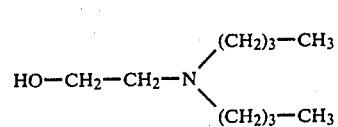

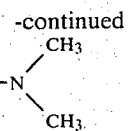

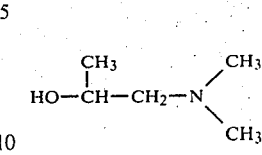

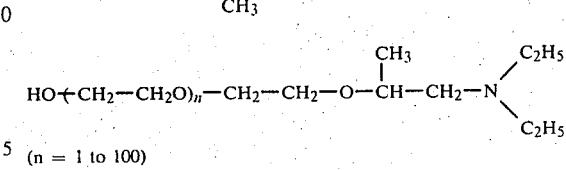

(n = 1 to 100)

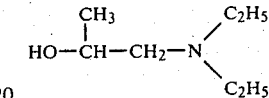

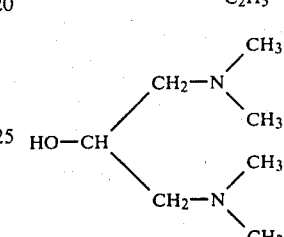

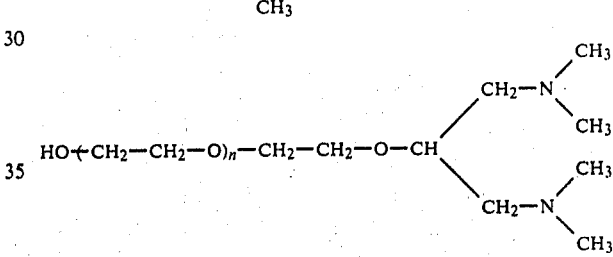

(n = 1 to 100)
HO—CH₂—CH₂—(O—CH₂—CH₂)ₙ—O—CH₃
HO—CH₂—CH₂—(O—CH₂—CH₂)ₙ—O—C₂H₅
HO—CH₂—CH₂—(O—CH₂—CH₂)ₙ—O—C₃H₇
HO—CH₂—CH₂—(O—CH₂—CH₂)ₙ—O—C₅H₁₁ (n = 1 to 100)
HO—CH₂—CH₂—OCH₃
HO—CH₂—CH₂—(O—CH₂—CH₂)ₙ—OC₄H₉
(n = 1 to 100)

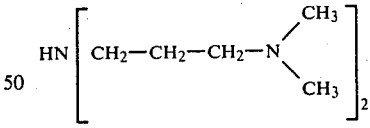

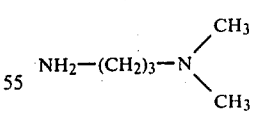

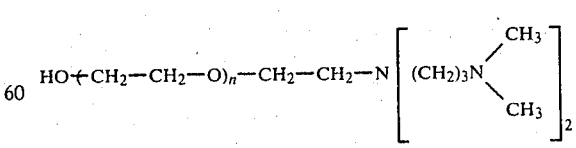

(n = 1 to 100)

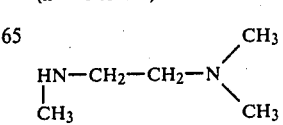

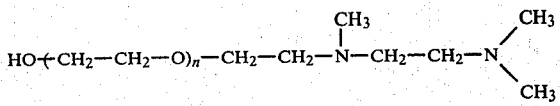

(n = 1 to 100)

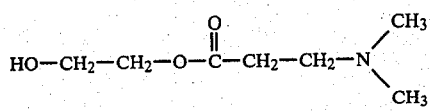

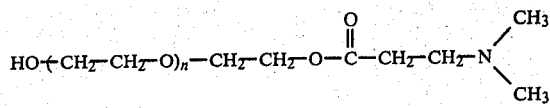

(n = 1 to 100)

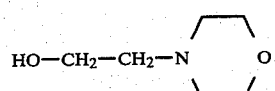

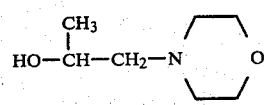

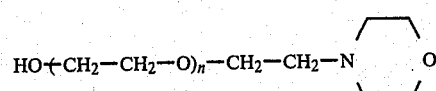

(n = 1 to 100)

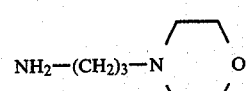

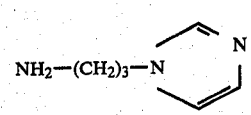

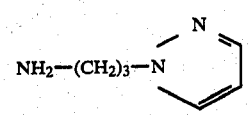

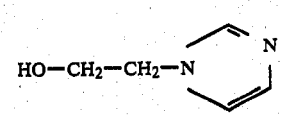

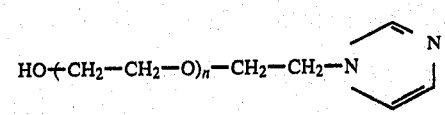

(n = 1 to 100)

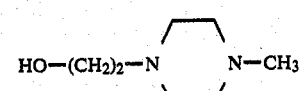

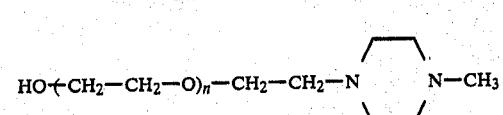

(n = 1 to 100)

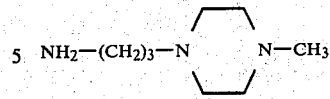

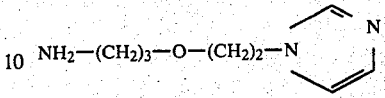

$NH_2-(CH_2)_2-OCH_3$

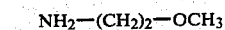

$NH-(CH_2)_3-O-CH_3$ and

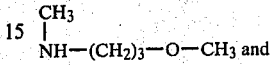

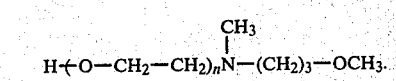

(n = 1 to 100)

In the process of the present invention, the polysiloxane component is generally first reacted with excess organic polyisocyanate to produce the corresponding isocyanate prepolymer in a first reaction step. For this reaction, the organopolysiloxanes are preferably reacted with the polyisocyanates at an equivalent ratio of isocyanate groups to isocyanate-reactive groups within the range of from 1.2:1 to 4:1, most preferably 1.5:1 to 3:1. The reaction is preferably carried out at temperatures from 30° C. to 100° C. A catalyst may be employed. Suitable catalysts include organic tin compounds such as tin-(II)-acetate, tin-(II)-octoate and dibutyl tin diacetate. Any excess polyisocyanate may be removed before the next reaction stage by thin layer distillation although it may, if desired, be left in the reaction mixture and carried to the next reaction stage, but this alternative is less advantageous.

The next reaction stage of the process of the present invention is reaction of the isocyanate prepolymer with the alcohol or amine starting components. The reactants for this stage are preferably used in quantities providing from 0.8 to 1.2, most preferably 1.0 alcoholic hydroxyl groups or primary or secondary amino groups for each isocyanate group of the previously prepared isocyanate prepolymer. The reaction is generally carried out in the temperature range of from 30° to 100° C., optionally using the above-identified catalysts for accelerating the isocyanate addition reaction. The individual reaction steps of the process of the present invention may, of course, also be carried out with the aid of suitable solvents (e.g., lacquer solvents) so that solutions of the mold release agents of the present invention in lacquer solvents which are required for the in-mold coating lacquers are obtained.

The various reactants could, in principle, of course, be reacted together in a different sequence in the process of the present invention. More specifically, a reaction product containing isocyanate groups could first be prepared by reacting the aliphatic alcohol and/or aliphatic primary and/or secondary amine starting component with the polyisocyanate. The resulting product could then be reacted with the polysiloxane. When this sequence is used, the alcohol and/or amine is preferably reacted with a large excess of polyisocyanate. The excess unreacted polyisocyanate may then be removed, for example, by thin layer distillation. The resulting reaction product containing isocyanate groups is then reacted with the polysiloxane preferably in an amount such that the equivalent ratio of isocyanate groups to isocyanate reactive groups is in the range of from 0.9:1 to 1.1:1, preferably 1:1.

The known catalysts described above may also be used in this less preferred variation of the process of the present invention. In this variation of the present invention, the reaction temperatures are generally in the range of from 30° to 100° C. This second variation of the process of the present invention is generally restricted to alcohols and amines containing hydroxyl groups.

The products of the process of the present invention are effective internal mold release agents for so-called "in-mold coating lacquers". This is particularly surprising since the mold release agents known in the art are generally unusable for this special field of application. In fact, even the related mold release agents containing hydroxyl groups disclosed in German Offenlegungsschrift 3,012,126 are distinctly inferior to the mold release agents of the present invention when used at comparable concentrations.

The constitution of the products obtained according to the invention is of decisive important for their effectiveness. If reaction products containing ether groups or tertiary amino groups are replaced by compounds containing neither ether nor tertiary amino groups, the effectiveness is markedly reduced. The siloxane starting materials do not show any significant mold release action in themselves. Although the mold release agents known in the art described in German Offenlegungsschiften 1,953,637, 2,121,670 and 2,427,273 do show a certain mold release action when used in in-mold coating lacquers, they have the disadvantage of exuding out of the layer of lacquer on the body of the molded article and generally produce tacky surfaces.

The products of the process of the present invention are generally added in quantities of from 0.1 to 50 wt. %, preferably from 2.5 to 20 wt. % (based on the lacquer binder) when used in in-mold coating lacquers.

The products of the process of the present invention are suitable for use as mold release agents for a wide variety of in-mold coating lacquers. Thus, for example, the products of the present invention may equally well be added to physically drying one-component polyurethane lacquers as to two-component polyurethane lacquers containing at least one polyhydroxyl compound and at least one organic polyisocyanate as binder. These products are also suitable for use in lacquers based on acrylates and those based on nitrocellulose. Auxiliary agents and additives commonly used in lacquers technology may also be advantageously employed with the mold release agents of the present invention.

The products of the present invention are particularly suitable for the production of both foamed and non-foamed polyurethane-based molded plastics which are coated with a layer of lacquer, especially the production of semi-rigid to rigid integral foams and foams used for filling.

When producing molded articles covered with a lacquer layer, the internal walls are generally lacquered with the in-mold coating lacquer containing the mold release agent before the reaction mixture for producing the polymer is introduced. The mold is then filled after the lacquer layer has partly dried. This method may be employed for producing lacquer coated bicycle and motorbike saddles, steering wheels, internal handles in motor cars, external and internal door cladding, armature cladding, arm rests, neck supports, spar sheaths, decorative bars and other molded articles based on plastics, in particular, articles based on semi-rigid to rigid polyurethane foams.

Having thus described our invention, the following examples are given by way of illustration. In these examples, all percentages are percentages by weight and all data given in "parts" are parts by weight.

EXAMPLES

EXAMPLE 1

333 g (1.5 mol) of 1-isocyantomethyl-5-isocyanato-1,3,3-trimethyl-cyclohexane were introduced dropwise into 1140 g (1 mol) of an $\alpha,\omega$-bis-hydroxymethyl-polydimethyl-siloxane having an OH content of 3.0%. The reaction mixture was heated to 50° C. until the prepolymer had an isocyanate content of 3.2%. The mixture was then cooled to 10° C. and 187 g of bis(dimethylaminopropyl)-amine were added with stirring. The reaction mixture was then left at 80° C. for about 3 hours, after which no isocyanate could be detected. A water-clear siloxane urethane having a viscosity at 25° C. of 22,400 mPas was obtained.

EXAMPLE 2

333 g (1.5 mol) of 1-isocyanatomethyl-5-isocyanato-1,3,3-trimethyl-cyclohexane were introduced dropwise into 1140 g (1 mol) of an $\alpha,\omega$-bis-hydroxymethyl-polydimethyl-siloxane having an OH content of 3.0%. An isocyanate content of 2.9% was obtained after 3 hours at 90° C. 8.75 g of dimethylaminoethanol were added to 146 g of the prepolymer at 50° C. and the reaction mixture was then kept at 80° C. until no more isocyanate could be detected.

A water-clear siloxane urethane having a viscosity of 17,500 mPas at 25° C. was obtained.

EXAMPLE 3

880 g of a product of addition of ethylene oxide to n-butanol having an OH number of 28 were added to 600 g of the prepolymer of Example 2. The mixture was homogenized with 1000 ml of dimethylformamide. No more isocyanate could be detected after 10 hours at 80° C. When the reaction mixture had been concentrated by evaporation and poured out, a substance crystallizing to a colorless solid was obtained. This solid was readily soluble in the usual lacquer solvents and had a softening point of 50° C.

EXAMPLE 4

22.7 g of 2-(2-dimethylaminoethoxy)-ethanol were added to 200 g of the prepolymer of Example 2 and the mixture was kept at 80° C. for 9 hours, after which no more isocyanate could be detected.

A colorless siloxane urethane having a viscosity of 13,000 mPas at 25° C. was obtained.

EXAMPLE 5

444 g (2 mol) of 1-isocyanatomethyl-5-isocyanato-1,3,3-trimethyl-cyclohexane were introduced dropwise into 1135 g (1 mol) of an $\alpha,\beta$-dihydroxymethyl-polydimethyl-siloxane having an OH content of 3.0%. An isocyanate content of 5.5% was obtained after 2 hours at 70° C.

35 g of 2-dimethylaminoethanol were added to 300 g of this prepolymer at 50° C. and the reaction mixture was kept at 80° C. for 6 hours, after which no more isocyanate could be detected. The viscosity of the product at 50° C. was 2020 mPas.

EXAMPLE 6

300 g of the prepolymer of Example 5 were cooled to 10° C. and 73 g of bis-(dimethylaminopropyl)amine were added. No more isocyanate could be detected after 6 hours at 90° C. The product viscosity at 50° C. was 4000 mPas.

EXAMPLE 7

61.5 g of 2-(2-dimethylaminoethoxy)-ethanol were added to 300 g of the prepolymer of Example 5 at 50° C. and the reaction mixture was kept at 90° C. for 6 hours, after which no more isocyanate could be detected. The product had a viscosity at 50° C. of 1650 mPas.

EXAMPLE 8

59 g of the prepolymer from Example 5, 155 g of an ethylene oxide adduct of n-butanol (OH number 28) and 150 ml of dimethylformamide were heated to 90° C. for 20 hours, after which no more isocyanate could be detected. The reaction mixture was concentrated by evaporation and solidified on cooling to a substance melting at 50° C. This solid could be worked up as a 50% solution in diethylene glycol monomethyl ester.

EXAMPLE 9

45.8 g of 2-diethylaminoethanol were added to 300 g of the prepolymer from Example 5 at 50° C. and kept at 90° C. for 6 hours, after which time no more isocyanate could be detected. The product had a viscosity at 50° C. of 1650 mPas.

EXAMPLE 10

502 g (2.4 mol) of 1-isocyanatomethyl-5-isocyanato-1,3,3-trimethyl-cyclohexane were introduced dropwise into 680 g (1.2 mol) of an $\alpha,\omega$-dihydroxymethyl-polydimethyl-siloxane having an OH content of 6.0%. The reaction mixture was kept at 70° C. for 2 hours and a prepolymer having an isocyanate content of 7.6% was obtained. 32.4 g of dimethylaminoethanol were added to 200 g of this prepolymer at 50° C. and the temperature was kept at 90° C. for 6 hours, after which no isocyanate could be detected. The product had a viscosity at 50° C. of 16,500 mPas.

EXAMPLE 11

200 g of the prepolymer from Example 10 were cooled to 10° C. and 68.2 g of bis-(dimethylaminopropyl)amine were added. No isocyanate could be detected after 5 hours at 80° C. The product had a viscosity at 50° C. of 52,000 mPas.

EXAMPLE 12

37.5 g of 2-(2-dimethylaminoethoxy)-ethanol were added to 200 g of the prepolymer from Example 10 at 50° C. The temperature was maintained at 80° C. for 5 hours, after which no isocyanate could be detected. The product had a viscosity at 50° C. of 4450 mPas.

EXAMPLE 13

42.8 g of diethylaminoethanol were added to 200 g of the prepolymer from Example 10 at 50° C. The mixture was kept at 80° C. for 6 hours, after which no isocyanate could be detected. The product had a viscosity at 50° C. of 9200 mPas.

EXAMPLE 14

110 g of an ethylene oxide adduct of n-butanol (OH number 28) were added to 30 g of the prepolymer from Example 10 at 50° C. and heated to 80° C. with 150 ml of dimethylformamide for 20 hours, after which no isocyanate could be detected. The reaction mixture was concentrated by evaporation and poured out. The product immediately crystallized to a solid with melting point 80° C. which was soluble in diethylene glycol monomethyl ester.

EXAMPLE 15

733 g (3.3 mol) of 1-isocyanatomethyl-5-isocyanato-1,3,3-trimethylcyclohexane were added to 1245 g (2.2 mol) of $\alpha,\omega$-bis-hydroxymethyl-polydimethyl-siloxane with OH content of 6.0%. An isocyanate content of 4.4% was obtained after 2 hours at 70° C.

27.8 g of dimethylaminoethanol were added to 300 g of this prepolymer at 50° C. and the reaction mixture was kept at 80° C. for 8 hours, after which no isocyanate could be detected. A product having a viscosity of 13,200 mPas at 80° C. was obtained.

EXAMPLE 16

300 g of the prepolymer from Example 15 were cooled to 10° C. and 58 g of bis-(dimethylaminopropyl)amine were added. The reaction mixture was kept at 80° C. for 6 hours and a siloxane urethane having a viscosity of 29,500 mPas at 50° C. was obtained.

EXAMPLE 17

48.5 g of 2-(2-dimethylaminoethylethoxy)ethanol were added to 300 g of the prepolymer from Example 15 at 50° C. and the reaction mixture was kept at 80° C. for 6 hours, after which no isocyanate could be detected. A product having a viscosity of 5600 mPas at 50° C. was obtained.

EXAMPLE 18

155 g of an ethylene oxide adduct of n-butanol (OH number 28) and 150 ml of dimethylformamide were added to 74 g of the prepolymer from Example 15 at 50° C. and the reaction mixture was kept at 80° C. for 20 hours, after which no isocyanate could be detected. The reaction mixture was concentrated by evaporation and a rapidly crystallizing product melting at 60° C. was obtained.

EXAMPLE 19

140 g of the prepolymer from Example 2 and 235 g of an ethylene oxide adduct of n-butanol (OH number 22.5) were heated to 80° C. in 250 ml of toluene until no isocyanate could be detected. The reaction mixture was then concentrated by evaporation and a urethane siloxane having a viscosity of 7300 mPas at 25° C. was obtained.

EXAMPLE 20

15 g of dimethylaminopropylamine were added to 200 g of the prepolymer from Example 2 at 10° C. with cooling. The reaction mixture was then stirred at 50° C. until no isocyanate could be detected. A urethane siloxane urea having a viscosity of 38,800 mPas at 50° C. was obtained.

EXAMPLE 21

500 g of the prepolymer from Example 2 and 267 g of an ethylene oxide adduct of n-butanol (OH number 80) were heated to 80° C. until no isocyanate could be detected. A urethane siloxane having a viscosity of 5240 mPas at 25° C. was obtained.

EXAMPLE 22

400 g of the prepolymer from Example 2 were cooled to 10° C. 35.4 g of 3-(3-aminopropyl)-imidazole were then added and the temperature rose to 50°–60° C. The reaction mixture was then kept at 70° C. until no isocyanate could be detected. A urethane siloxane having a viscosity of 12,000 mPas/80° C. was obtained.

The lacquer formulations employed in making molded articles in the following Examples were as follows:

I. A one-component lacquer suitably adjusted for spraying was composed of
- 3.7 parts of a commercial linear polyurethane polyurea (Desmolac ® 4125 of Bayer, AG, Leverkusen),
- 27.6 parts of a 10% solution of a partially saponified copolymer of polyvinyl chloride and polyvinyl acetate having a hydroxyl content of 2%,
- 8.9 parts of butyl acetate,
- 16.1 parts of xylene,
- 19.5 parts of butanol,
- 3.5 parts of cyclohexanone,
- 8.9 parts of diacetone alcohol and
- 11.8 parts of a commercial pigment paste filled with organic red pigment.

II. A two-component lacquer suitably adjusted for spraying was made of
- 5.8 parts of an aliphatic polyester diol having an OH content of 5.2% prepared by esterification of 0.9 mol of adipic acid, 0.01 mol of maleic acid anhydride, 0.09 mol of phthalic acid anhydride, 0.3 mol of trimethylolpropane and 1.13 mol of 1,2-dihydroxypropane,
- 1.6 parts of an aliphatic polyester diol with OH content of 1.8 prepared by esterification of 1 mol of adipic acid with 1.05 mol of diethylene glycol and 0.07 mol of trimethylol propane,
- 8.6 parts of a 20% solution of a partially saponified copolymer of polyvinyl chloride and polyvinyl acetate with OH content 2% in methyl ethyl ketone.
- 53 parts of a solvent mixture of methyl ethyl ketone/toluene/ethylene glycol acetate/butyl acetate (4:1:4:1).
- 6.1 parts of an inorganic pigment, and
- 11.9 parts of a 60% solution in butyl acetate of a polyisocyanate containing isocyanurate groups which had been prepared by mixed trimerization of 2,4-diisocyanatotoluene and hexamethylene diisocyanate in a molar ratio of 3:2, the solution having an isocyanate content of 10.5%.

III. A primer lacquer suitably adjusted for spraying was composed of
- 17.5 parts of the physically drying polyurethane polyurea used in lacquer I,
- 28.2 parts of the copolymer used in lacquer I,
- 9.1 parts of butyl acetate,
- 16.5 parts of xylene,
- 19.9 parts of butanol,
- 3.5 parts of cyclohexanone,
- 4.5 parts of titanium dioxide pigment (rutile),
- 1.5 parts of talcum and
- 2.0 parts of the pigment Efweko Black NC 18/2 ® (manufactured by Degussa) as a 20% solution in ethyl glycol acetate.

IV. An acrylate lacquer suitably adjusted for spraying was composed of
- 10 parts of the polymethyl methacrylate Paraloid B 48N ® of Rohm and Haas,
- 90 parts of solvent mixture of toluene/diacetone alcohol/isopropanol (1:1:1), and
- 18 parts of a commercial pigment paste filled with organic red pigment.

V. A lacquer suitably adjusted for spraying, based on a copolymer, consisted of
- 5 parts of a copolymer of 91% of polyvinyl chloride, 3% of polyvinyl alcohol and 6% of polyvinyl acetate,
- 95 parts of a solvent mixture of toluene/diacetone alcohol/isopropanol (1:1:1), and
- 18 parts of a commercial pigment paste filled with organic red pigment.

VI. A nitrocellulose-based lacquer suitably adjusted for spraying consisted of
- 25.7 parts of a fatty acid-modified phthlate resin (Alkydale RD 181 ® of Bayer AG) in xylene (75% solution),
- 1.5 parts of the ketone aldehyde condensation resin SK of Chem. Werke Hüls in butyl acetate (50% solution),
- 1.4 parts of dibutylphthalate,
- 1.4 parts of benzyl butyl phthalate,
- 14.1 parts of a medium viscosity nitrocellulose (NC wool E 620 of Wolff-Walsrode),
- 12.4 parts of a commercial pigment paste filled with titanium dioxide (rutile),
- 10.6 parts of butyl acetate,
- 6.9 parts of ethyl acetate,
- 5.3 parts of ethyl glycol,
- 2.9 parts of butanol, and
- 16.6 parts of xylene.

VII. The acrylate-based two-component lacquer suitably adjusted for spraying was composed of
- 200 parts of a copolymer with OH content 2% of methyl methacrylate, methacrylic acid-2-hydroxyethyl ester, 2-ethylhexyl acrylate and acrylic acid in the form of a 50% solution in xylene/ethylene glycol acetate (1:1),
- 200 parts of a 20% solution of cellulose acetobutyrate in ethylene glycol acetate,
- 132 parts of ethylene glycol acetate,
- 132 parts of ethyl acetate,
- 1.2 parts of zinc octoate (10% solution in toluene),
- 7.4 parts of the black pigment Spezialschwarz IV of Degussa,
- 12.4 parts of the matting agent OK 412 of Degussa, and
- 30 parts of a 75% solution in ethyl glycol acetate/xylene (1:1) of a polyisocyanate containing biuret groups, based on a hexamethylene diisocyanate, isocyanate content of the solution 14%.

In the following Examples, the lacquer formulations I–VII were combined with the mold release agents described in Examples 1 to 21 in the manner described. Mold release agents known in the art were used in the comparison Examples.

The lacquers containing mold release agents were sprayed over the surfaces of the molds on the sides facing the plastics product to be produced. The lacquers were used in quantities producing films having a thickness of from about 0.03 to 0.05 mm when dry. No external mold release agents were used. The reaction mixture from which the plastic product was to be produced was fed into the molds as soon as the lacquer had a nontacky surface. The lacquer was applied by means of compressed air spray guns. The mixtures which were to react to produce the plastic product were introduced by injection machines operating on the principle of counterflow injection (HK machines, Maschinenfabrik Hennecke GmbH, 5205 Skt. Augustin).

The adherence of the lacquers to the molded articles was tested by the following method: a grid pattern was cut into a surface 1 cm² in area with cuts 1 mm apart using a penknife. Adhesive tape was pressed over the cut surface and then pulled off. The extent to which the lacquer came off with the tape depended upon the strength of adherence. This adherence was assessed from the proportion of area left covered by the lacquer layer to the area stripped of lacquer.

The abrasion resistance was determined by the Crockmeter test based on DIN 5402.

EXAMPLE 23

(Bicycle saddle)

The mold was an epoxide resin mold with structured internal surface for bicycle saddles which was at a temperature of 45° C. The lacquer used was made by mixing the lacquer I with 10% (based on the quantity of binder) of the mold release agent of Example 19. 1.4 parts of mold release agent were dissolved in 5 parts of toluene before being mixed with lacquer I.

The clean, fat-free internal surface of the mold was coated with the above-described lacquer. After a drying time of about 45 seconds, a nontacky lacquer film 0.03 mm in thickness was obtained. The mold was filled with a two-component mixture which foamed up inside the mold in known manner.

The polyol component of the two-component foamable mixture was composed of
- 100 parts of a trifunctional polyether polyol with OH number 35 obtained by the alkoxylation of trimethylolpropane using propylene oxide followed by grafting with about 15% of ethylene oxide (based on the total quantity of alkylene oxide),
- 9 parts of ethylene glycol,
- 0.4 parts of diazabicyclooctane (33% in diisopropanol) and
- 14 parts of trichlorofluoromethane.

The polyisocyanate component of the foamable mixture consisted of 43 parts of a polyisocyanate mixture of the diphenylmethane series modified with dipropylene glycol. It had an isocyanate content of 28% and a viscosity at 25° C. of 130 mPas.

The quantity of foamable mixture was calculated to produce a molded article having a gross density of 300 g/cc. After a reaction time for the foamable mixture of 4 minutes, the molded article covered with a layer of lacquer could be removed from the mold. The surface was flawless and tack-free. A total of 30 bicycle saddles could be produced in this way without any problems in removal from the mold.

|  | 1st saddle | 30th saddle |
| --- | --- | --- |
| Adherence of lacquer | good | good |
| Crockmeter test | good (dry) | good (dry) |
| | good (wet) | good (wet) |

EXAMPLE 24

(Steering wheels for passenger cars)

A mold made of metal with a structured surface at a temperature of 45° C. was used in this Example. The lacquer employed was the one-component lacquer I with 1.4 parts of the mold release agent of Example 21 (which corresponded to 10% based on the quantity of binder).

The clean mold which was free from fat and grease was directly coated with the above-described self-freeing lacquer (dry film thickness 0.03 mm) and filled with the same foam and in the manner described in Example 23. After a reaction time of 4 minutes, the lacquered article having a gross density of 300 g/cc was ready to be removed. All articles produced in the mold could be completely removed from it without any difficulty. The surface showed no flaws and did not stick.

|  | 1st steering wheel | 30th steering wheel |
| --- | --- | --- |
| Adherence of lacquer | good | good |
| Crockmeter test | good (dry) | good (dry) |
| | good (wet) | good (wet) |

EXAMPLE 25

(Spar sheaths)

An epoxide resin mold with structured surface at a temperature of 40° C. was used in this Example. The lacquer employed was the one-component lacquer I containing 1.4 parts of the mold release agent of Example 21 dissolved in 5 parts of toluene (which corresponds to 10%, based on the quantity of binder). The dry film had a thickness of 0.03 mm. The following filling foam was introduced into the mold after about 45 seconds:
- 100 parts of a trifunctional polyether polyol with OH number 28 prepared by the propoxylation of trimethylolpropane followed by grafting with about 15% of ethylene oxide (based on the total quantity of alkylene oxides),
- 10 parts of propoxylated trimethylolpropane with OH number 530,
- 0.2 parts of diazabicyclooctane (33% in diisopropanol), and
- 2.2 parts of water.

This polyol mixture was mixed mechanically and combined with 48 parts of a dipropylene glycol-modified polyisocyanate mixture of the diphenylmethane series having an isocyanate content of 31% and a viscosity at 25° C. of 200 mPas to produce a foamable mixture as described in Example 23. The lacquered article could be removed from the mold after the reaction time for the foamable mixture. The gross density of the plastics product obtained was in the region of 150 g/cc and the film thickness of the lacquer was 0.03 mm. All articles produced could be completely removed from the mold without any difficulty. The surface was flawless.

|                      | 1st article | 30th article |
|----------------------|-------------|--------------|
| Adherence of lacquer | good        | good         |
| Crockmeter test      | good (dry)  | good (dry)   |
|                      | good (wet)  | good (wet)   |

EXAMPLE 26

(Bicycle saddle)

An epoxide resin mold with structured surface at a temperature of 45° C. was used in this Example. The lacquer employed was acrylate lacquer IV with 1.0 part of the mold release agent of Example 21 (which corresponds to 10% of binder dissolved in 5 parts of toluene).

The clean mold which was free from fat and grease was directly sprayed with the above-described lacquer containing mold release agent. The mold was filled by foaming up the reaction mixture described in Example 23. The dry film thickness of the lacquer applied to the internal wall of the mold was 0.03 mm. The gross density of the molded plastic article produced was 300 g/cc. Thirty bicycle saddles were produced by this method. All articles produced could be completely released from the mold without any difficulty.

|                      | 1st article | 30th article |
|----------------------|-------------|--------------|
| Adherence of lacquer | good        | good         |
| Crockmeter test      | good (dry)  | good (dry)   |
|                      | good (wet)  | good (wet)   |

EXAMPLE 27

(Bicycle saddle)

An epoxide resin mold with structured surface at a temperature of 45° C. was used in this Example. Lacquer V in which 0.5 parts of the mold release agent of Example 19 (which corresponds to 10% of binder dissolved in 5 parts of toluene) was directly sprayed onto the clean mold which was free from fat and grease. The mold was filled by foaming up the reaction mixture described in Example 23. The molded article having a gross density of 300 g/cc covered with a lacquer layer of about 0.03 mm could be removed from the mold after a reaction time of 4 minutes. Thirty bicycle saddles were produced in this manner. The molded articles could be completely removed from the mold without difficulty in all cases.

|                      | 1st article | 30th article |
|----------------------|-------------|--------------|
| Adherence of lacquer | good        | good         |
| Crockmeter test      | good (dry)  | good (dry)   |
|                      | good (dry)  | good (wet)   |

EXAMPLE 28

(Bicycle saddle)

An epoxide resin mold with structured surface at a temperature of 45° C. was used in this example. The lacquer used was lacquer VI based on nitrocellulose, and 1.6 parts of lacquer additive of Example 21 (which corresponds to 5% based on binder, dissolved in 5 parts of toluene). The clean mold which was free from fat and grease was directly sprayed with the above-described lacquer. The mold was filled with the reaction mixture of Example 23. After a reaction time of 4 minutes, the molded article which had a gross density of 300 g/cc and was covered with a lacquer layer of 0.03 mm thickness could be removed from the mold. The experiment was carried out a total of 30 times. All articles produced could be completely removed from the mold without difficulty.

|                      | 1st article | 30th article |
|----------------------|-------------|--------------|
| Adherence of lacquer | good        | good         |
| Crockmeter test      | good (dry)  | good (dry)   |
|                      | good (wet)  | good (wet)   |

EXAMPLE 29

(Boards)

A metal mold measuring 40 cm×40 cm×0.8 cm with structured surface at a temperature of 60° C. was used in this example. The lacquer was made up of the primer lacquer III, and 0.33 parts of lacquer additive of Example 17 (which corresponds to 5% based on binder, dissolved in 3 parts of toluene). The clean mold which was free from fat and grease was sprayed with the above-described lacquer and after a ventilation time of 2 seconds the mold was filled with the following reaction mixture containing filler:

100 parts of the polyether polyol with OH number 28 of Example 25, 15 parts of ground glass fiber filler having a length of 0.03 to 0.5 mm, 50 parts of a mixture of 65% of 1-methyl-3,5-diethyl-phenylenediamine-(2,4) and 35% of 1-methyl-3,5-diethylphenylene diamine-(2,6), and 0.2 parts of a complex of 1 mol of dibutyl tin dilaurate and 1 mol of 2,3-dimethyl-3,4,5,6-tetrahydropyrimidine and 50 parts of a reaction product of tripropylene glycol with 4,4'-diphenylmethane diisocyanate (isocyanate content: 23%).

The reaction mixture was worked up by the reaction injection molding process. The mixture was removed from the mold after a reaction time of only 40 seconds. A molded article having a gross density of 1200 g/cc covered with a layer of primer lacquer 0.05 mm in thickness was obtained. A total of 30 molded articles was produced in this manner. All articles produced could be released from the mold completely and without difficulty. The lacquer coat was flawless and tack-free.

|                      | 1st article | 30th article |
|----------------------|-------------|--------------|
| Adherence of lacquer | good        | good         |
| Crockmeter test      | good (dry)  | good (dry)   |
|                      | good (wet)  | good (wet)   |

The primer lacquer could be covered by spraying with the two-component lacquer II without further cleaning. After drying overnight at room temperature, this two-component lacquer showed good adherence and gave good results in the Crockmeter test. The surface was well marked and flawlessly smooth.

EXAMPLE 30

(Boards)

The metal mold with structured surface used in Example 29 was kept at a temperature of 60° C. in this Example. The lacquer used was made up of the two-component lacquer II and 2.0 parts of the lacquer additive of Example 17 (which corresponds to 10% based on binder dissolved in 2.0 parts of toluene).

The clean mold which was free from fat and grease was sprayed with the above-described lacquer and after a ventilation time of 20 seconds the mold was filled with the reaction mixture described in Example 29. The molded article which had a gross density of 1200 g/cc and was covered with a layer of lacquer about 0.05 mm in thickness could be removed from the mold after 40 seconds. A total of 30 molded articles was produced in this manner. Release from the mold proceeded smoothly in all cases and the lacquer was well structured and completely tack-free.

|  | 1st article | 30th article |
| --- | --- | --- |
| Adherence of lacquer | good | good |
| Crockmeter test | good (wet) | good (wet) |
|  | good (dry) | good (dry) |

EXAMPLE 31

(Boards)

The metal mold with structured surface described in Example 29 at a temperature of 60° C. was used. The lacquer was made up of the two-component lacquer VII and a lacquer additive of 7.0 parts of the mold release agent of Example 17 dissolved in 7.0 parts of toluene (which corresponds to 5% based on the quantity of binder). The clean mold which was free from fat and grease was sprayed with the above-described lacquer and after a ventilation time of 20 seconds the mold was filled with the reaction mixture of Example 29. After a reaction time of 40 seconds, the molded article which had a gross density of 1200 g/cc and was covered with a layer of lacquer about 0.05 mm in thickness could be removed from the mold. A total of 30 molded articles was produced in this manner. Removal from the mold proceeded smoothly in all cases. The lacquer was well structured and completely tack-free.

|  | 1st article | 30th article |
| --- | --- | --- |
| Adherence of lacquer | good | good |
| Crockmeter test | good (wet) | good (wet) |
|  | good (dry) | good (dry) |

EXAMPLE 32

(Boards)

The metal mold with structured surface described in Example 29 at a temperature of 60° C. was used in this Example. The lacquer used was made up of the two-component lacquer VII and 10.5 parts of the mold release agent of Example 20 dissolved in 10.5 parts of toluene (which corresponds to 7.5% based on the quantity of binder).

The clean mold which was free from fat and grease was sprayed with the above-described lacquer. After a ventilation time of 20 seconds, the mold was filled with the reaction mixture described in Example 29. After a reaction time of 40 seconds, the molded article which had a gross density of 1200 g/cc and was covered with a lacquer layer about 0.05 mm in thickness could be removed from the mold. A total of 30 molded articles was produced in this manner. The articles could, in all cases, be removed smoothly from the mold. The lacquer was perfectly structured and completely tack-free.

|  | 1st article | 30th article |
| --- | --- | --- |
| Adherence of lacquer | good | good |
| Crockmeter test | good (wet) | good (wet) |
|  | good (dry) | good (dry) |

EXAMPLE 33

(Steering wheel for passenger car, comparison example)

A metal mold with structured surface at a temperature of 45° C. was used in this Example. The lacquer used was the one-component lacquer I and 0.7 parts of the mold release agent of Example IX of German Offenlegungsschrift No. 1,953,637 (which corresponds to 5% based on the quantity of binder).

The foamable reaction mixture described in Example 23 was used to fill the mold. The procedure was otherwise analogous to that of Example 23.

The lacquered article could be removed after a reaction time of 4 minutes. The lacquered steering wheel could also be removed from the mold without any difficulty but the surface was tacky and covered with exudations.

EXAMPLE 34

(Steering wheel for passenger car, comparison example)

A metal mold with structured surface at a temperature of 45° C. was used in this experiment. The lacquer used was made up of the one-component lacquer I and the mold release agent described in Example 1 of German Offenlegungsschrift No. 3,012,126 (1.4 parts dissolved in 5 parts of toluene which corresponds to 10% based on the quantity of binder).

The procedure and foamable mixture were the same as that described in Example 23. After a reaction time of 4 minutes, the lacquered article could not be removed from the mold without destruction of its surface due to sticking of the lacquer layer. The urethane siloxane urea used was not suitable as mold release agent for the lacquer.

EXAMPLE 35

(Steering wheel for passenger car, comparison example)

A metal mold with structured surface at a temperature of 45° C. was used in this Example. The lacquer used was made up of the one-component lacquer I and a mold release agent made of 1.4 parts of a $\alpha,\omega$-bis-hydroxymethyl-polydimethyl-siloxane with OH content 3.0% (which corresponds to 10% based on the quantity of binder). The procedure and foamable mixture were the same as those used in Example 23. After a reaction time of 4 minutes, the lacquered article could not be removed from the mold without destruction of its surface due to adherence of the lacquer layer to the mold. The siloxane used was not suitable as mold release agent for use in the lacquer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethane-based molded articles covered with a lacquer in which
   (1) internal walls of a mold are lacquered with an in-mold coating lacquer containing a mold release agent which is a reaction product of:
      (a) a first reaction product of a polysiloxane having isocyanate reactive end groups and an excess of organic polyisocyanate which first reaction product contains at least two isocyanate end groups and
      (b) a compound selected from the group consisting of aliphatic alcohols, primary aliphatic amines, secondary aliphatic amines and mixtures thereof which have a molecular weight of from 75 to 5000 and which is monofunctional in the isocyanate addition reaction and contains at least one tertiary amino group and/or oxyalkylene unit before a reaction mixture for producing the polyurethane is introduced into the mold,
   (2) filling the mold with polyurethane-forming mixture after the lacquer has partially dried, and
   (3) allowing the contents of the mold to solidify.

2. A process for the production of polyurethane-based molded articles covered with a lacquer in which
   (1) internal walls of a mold are lacquered with an in-mold coating lacquer containing a mold release agent which is the reaction product of:
      (a) a first reaction product of a (i) compound selected from the group consisting of aliphatic alcohols, primary aliphatic amines, secondary aliphatic amines and mixtures thereof having a molecular weight of from 75 to 5000 and which is monofunctional in the isocyanate addition reaction and contains at least one tertiary amino group and/or oxyalkylene unit and (ii) an excess of organic polyisocyanate and
      (b) a polysiloxane containing isocyanate reactive end groups which is difunctional in an isocyanate addition reaction before reaction mixture for producing the polyurethane is introduced into the mold,
   (2) filling the mold after the lacquer has partially dried with polyurethane forming mixture and
   (3) allowing the contents of the mold to solidify.

3. The process of claim 1 wherein the lacquer topcoat contains a linear polyurethane polyurea binder.

4. The process of claim 2 wherein the lacquer topcoat contains a linear polyurethane polyurea binder.

5. The process of claim 1 wherein the lacquer topcoat contains a binder made of an organic polyisocyanate and a polyhydroxyl compound.

6. The process of claim 2 wherein the lacquer topcoat contains a binder made of an organic polyisocyanate and a polyhydroxyl compound.

* * * * *